US007944335B2

(12) United States Patent
Klossek et al.

(10) Patent No.: US 7,944,335 B2
(45) Date of Patent: May 17, 2011

(54) OPERATING ELEMENT WITH TILT HAPTICS

(75) Inventors: Arthur Klossek, Windshausen (DE); Andreas Kramlich, Schweinfurt (DE); Peter Rajec, Bischofsheim (DE)

(73) Assignee: Preh GmbH (DE)

( * ) Notice: Subject to any disclaimer, the term of this patent is extended or adjusted under 35 U.S.C. 154(b) by 12 days.

(21) Appl. No.: 12/018,174

(22) Filed: Jan. 22, 2008

(65) Prior Publication Data

US 2008/0202278 A1 Aug. 28, 2008

Related U.S. Application Data

(63) Continuation of application No. PCT/EP2006/007044, filed on Jul. 18, 2006.

(30) Foreign Application Priority Data

Jul. 19, 2005 (DE) ............................ 102005033550
Jan. 19, 2006 (DE) ............................ 102006002634

(51) Int. Cl.
*G06F 3/033* (2006.01)
*G09G 5/00* (2006.01)
*H01H 9/00* (2006.01)

(52) U.S. Cl. ........................................ 335/207; 345/161

(58) Field of Classification Search .......... 335/205–207; 200/404; 345/161
See application file for complete search history.

(56) References Cited

U.S. PATENT DOCUMENTS

| | | | | |
|---|---|---|---|---|
| 3,681,727 | A * | 8/1972 | Hallmann | 335/253 |
| 4,519,266 | A * | 5/1985 | Reinecke | 74/471 XY |
| 5,421,694 | A * | 6/1995 | Baker et al. | 414/694 |
| 5,773,773 | A * | 6/1998 | McCauley et al. | 200/6 A |
| 6,109,130 | A * | 8/2000 | Will | 74/470 |
| 6,246,307 | B1 * | 6/2001 | Friedman | 335/205 |
| 6,320,284 | B1 * | 11/2001 | Fontana et al. | 310/12.31 |
| 6,664,666 | B2 * | 12/2003 | Corcoran | 310/12.23 |
| 6,755,195 | B1 * | 6/2004 | Lemke et al. | 128/849 |
| 6,909,205 | B2 * | 6/2005 | Corcoran et al. | 310/12.14 |
| 6,909,353 | B2 * | 6/2005 | Romero Herrera et al. | 338/32 H |
| 2003/0137394 | A1 * | 7/2003 | Romero Herrera et al. | 338/32 H |
| 2004/0124717 | A1 * | 7/2004 | Corcoran et al. | 310/12 |

FOREIGN PATENT DOCUMENTS

DE 4109544 A1 * 9/1992

* cited by examiner

*Primary Examiner* — Elvin G Enad
*Assistant Examiner* — Alexander Talpalatskiy
(74) *Attorney, Agent, or Firm* — Cantor Colburn LLP

(57) ABSTRACT

An operating element is provided, in particular a joystick, with tilt haptics for a motor vehicle, having a tiltably supported lever with one primary lever arm and at least one secondary lever arm, as well as at least one pair of permanent magnets, wherein one magnet of a permanent magnet pair is located on a secondary lever arm and one magnet is located in a fixed position in the operating element in such a manner that unlike poles of the magnets are located opposite and a distance apart from one another when the operating element is in its center position.

3 Claims, 4 Drawing Sheets

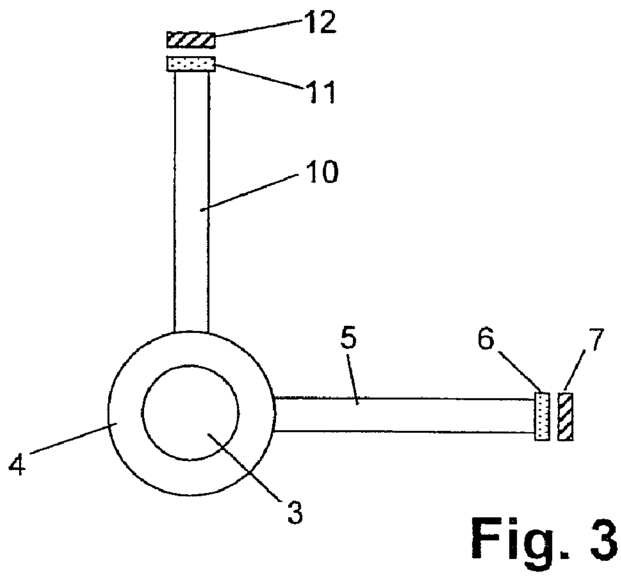
Fig. 3
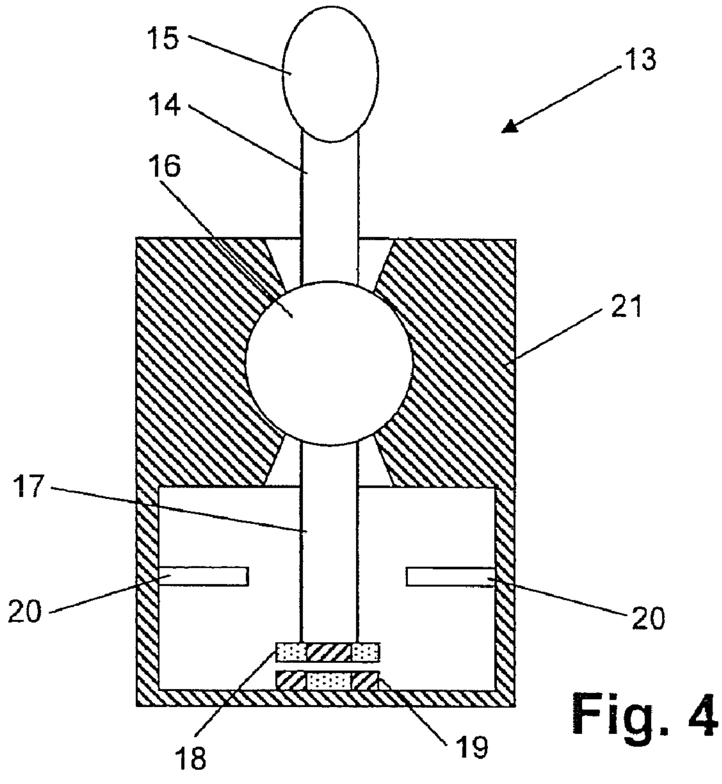
Fig. 4
Fig. 5
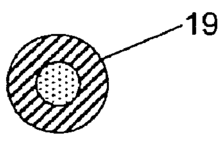

OPERATING ELEMENT WITH TILT HAPTICS

This nonprovisional application is a continuation of International Application No. PCT/EP2006/007044, which was filed on Jul. 18, 2006, and which claims priority to German Patent Application Nos. DE 102005033550 and DE 102006002634, which were filed in Germany on Jul. 19, 2005 and Jan. 19, 2006, and which are both herein incorporated by reference.

BACKGROUND OF THE INVENTION

1. Field of the Invention

The present invention relates to an operating element, in particular a joystick, with tilt haptics.

2. Description of the Background Art

Operating elements that are operated by a tilting motion are frequently used in motor vehicles. Examples of this include rocker switches for electric window regulators or electrically adjustable outside mirrors, as well as joysticks for controlling an on-board computer. For more convenient operation and for haptic feedback of actuation, a force that varies over the excursion of the operating element is needed; this force communicates to the user that the switching action has taken place. In the operating elements currently available, this force is customarily produced by one or more springs, which optionally also return the operating element to a center position when the user releases the element. The disadvantage of using springs, however, is that the spring force decreases over the lifetime of the operating element, and an optimal force curve cannot be achieved over the excursion of the operating element.

SUMMARY OF THE INVENTION

It is therefore an object of the present invention to provide an operating element with tilt haptics that is simple and economical in construction, while also having a favorable force curve.

An inventive operating element, which in particular is designed as a joystick, has a tiltably supported lever with one primary lever arm and at least one secondary lever arm as well as at least one pair of permanent magnets, wherein one magnet of a permanent magnet pair is located on a secondary lever arm and one magnet is located in a fixed position in the operating element in such a manner that unlike poles of the magnets are located opposite and a distance apart from one another when the operating element is in the center position.

The primary lever arm is the part of the operating element that the user moves when actuating the element. The motion of the primary lever arm is transmitted to at least one secondary lever arm by means of a bearing. The bearing is designed as a ball joint or as a four-way rocker, for example. One magnet of the permanent magnet pair is attached to a secondary lever arm, the second magnet is stationary in the operating element. When the primary lever arm is moved by the user, the secondary lever arms, and thus the permanent magnets arranged thereon, are also moved. This results in a relative motion between the two magnets of a magnet pair. In this process, like poles of the two magnets are pushed past one another, resulting in a magnetically generated restoring force that the user must overcome when actuating the operating element.

As a result of the magnetically produced force, the user receives haptic feedback of the actuation that has taken place, and in addition, the lever is automatically moved back to the initial position as soon as the user releases it. The force curve over the excursion of the operating element depends on these parameters: the length of the secondary lever arm, the strength of the permanent magnets, the physical size of the permanent magnets, and the size of the air gap between the magnets of a permanent magnet pair.

The advantage of the magnetically generated force curve resides in the fact that magnets are subject to much less aging than springs, and thus generate constant haptics over the lifetime of the operating element. The risk of spring breakage is also absent. The tilt haptics can be produced for two opposite tilt directions of the lever with a single permanent magnet pair through a symmetrical construction of the permanent magnets.

The operating element preferably has a mechanical limit stop for the lever. This prevents the situation where, beyond a certain excursion of the lever, the permanent magnets are in a position relative to one another in which like poles repel one another such that the lever moves further out of the center position. The limit stop is optionally designed as an elastic element, resulting in a steady force curve instead of a hard limit stop with steeply rising opposing force.

In one embodiment of the invention, the primary and secondary lever arms are arranged at right angles to one another. This results in an operating element with especially small overall height.

In one embodiment of the invention, the operating element has two secondary lever arms. This results in two tilt planes and four tilt directions for the lever. The two secondary lever arms are preferably arranged at right angles to one another. This has the result that the possible tilt planes of the lever stand perpendicular to one another. As a result, the operating element has tilt haptics with tilt directions oriented in the shape of a cross. The primary lever arm is preferably arranged at right angles to the two secondary lever arms. This again leads to especially small overall height of the operating element.

In an alternative embodiment, the operating element has exactly one secondary lever arm, which constitutes an extension of the primary lever arm. As a result, it is possible to produce tilt haptics for different tilt directions using only one secondary lever arm. In this connection, the permanent magnets are preferably round in design and have concentric poles. In this way, the same force curve is produced in any desired direction of tilt.

The principle of producing haptic feedback by means of a pair of permanent magnets can also be applied to a pushbutton as disclosed in claim 9. An inventive pushbutton has one moving part and one nonmoving part in addition to at least one pair of permanent magnets, wherein one magnet of a permanent magnet pair is located on the moving part and one magnet is located on the nonmoving part in such a manner that unlike poles of the magnets are located opposite and a distance apart from one another when the pushbutton is in its unactivated state. Activating the pushbutton produces a relative motion between the two magnets of a permanent magnet pair, causing like poles of the two magnets to be pushed past one another, thus generating an opposing force. As in the operating element described above, the restoring force in the pushbutton also performs two functions. First of all, it communicates to the user by haptic means that the switch action has taken place, and secondly, the pushbutton is automatically moved back to the home position as soon as the user lets go of it.

Preferably the pushbutton has a stop for the moving part of the pushbutton. This stop is made, in particular, of an elastic material. The advantages of the elastic stop, in particular, correspond to the aforementioned advantages in an operating element with tilt haptics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a part of an operating element with two secondary lever arms,

FIG. 4 illustrates another embodiment of an inventive operating element,

FIG. 5 is a round permanent magnet with concentric poles, and

DETAILED DESCRIPTION

Figure 1:
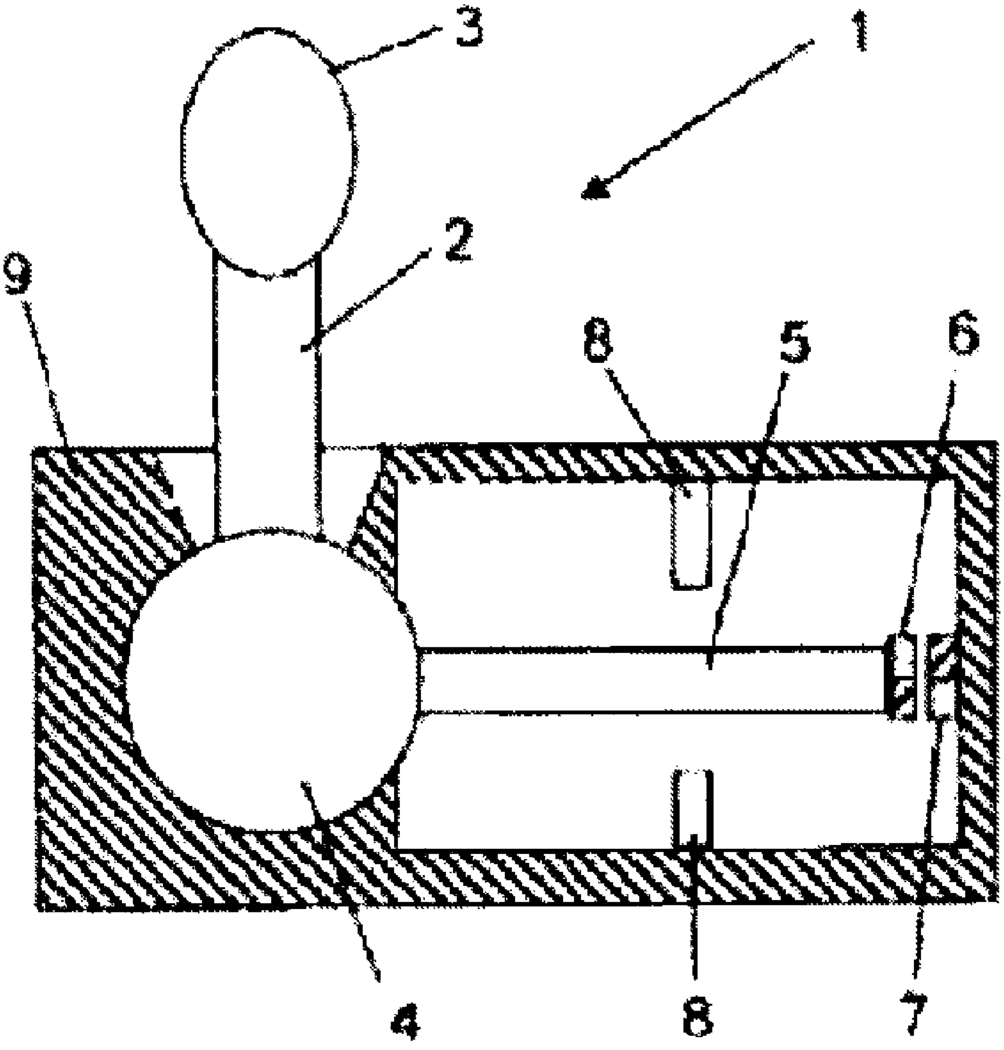
FIG. 1 illustrates an inventive operating element.

FIG. 1 shows a lateral cross-sectional representation of an inventive operating element 1.

The housing 9 of the operating element 1 has a recess in which a ball 4 as a bearing for a lever is arranged. The lever has a primary lever arm 2 and a secondary lever arm 5. One end of the lever arm 2 is rigidly attached to the ball 4, the other end bears a handle 3 in the form of an operating knob. Alternatively, the handle 3 has the functionality of, for example, a rotary control and/or a pushbutton.

One end of the secondary lever arm 5 is rigidly attached to the ball 4. The other end bears a permanent magnet 6. A second permanent magnet 7 is arranged in the housing 9 in such a way that when the primary lever arm 2 is in its center position, an air gap exists between the magnet 6 and the magnet 7, and unlike poles of the magnets 6 and 7 are opposite one another. In all example embodiments, the north pole of a magnet is shown with dotted fill and the south pole of a magnet is shown with cross-hatching. The limit stops 8 delimit the range of motion of the secondary lever arm 5, and hence of the primary lever arm 2.

The secondary lever arm 5, and hence the entire lever, is held in the center position by the force between the magnets 6 and 7. The user must overcome this force in order to tilt the primary lever arm. This force depends on the length of the secondary lever arm 5, the strength of the magnets 6 and 7, and the distance between the magnets 6 and 7, among other factors. The opposing force that the user must overcome to further tilt the primary lever arm 2 is plotted in FIG. 2 over the excursion s of the primary lever arm 2.

The cross-sectional representation in FIG. 1 shows the operating element 1. The tilting motion of the primary lever arm 2 is transmitted by the ball 4 to the secondary lever arm 5. This movement of the secondary lever arm 5 results in relative movement between the magnets 6 and 7. Starting with the excursion of the lever shown in position b of FIG. 2, the repulsive force between the north poles of the magnets 6 and 7 is opposite in direction to the attractive force of the unlike poles of the magnets 6 and 7. This means that the force the user must apply to further tilt the lever decreases. This decrease in restoring force gives the user haptic feedback that the switching action has taken place.

Figure 2:
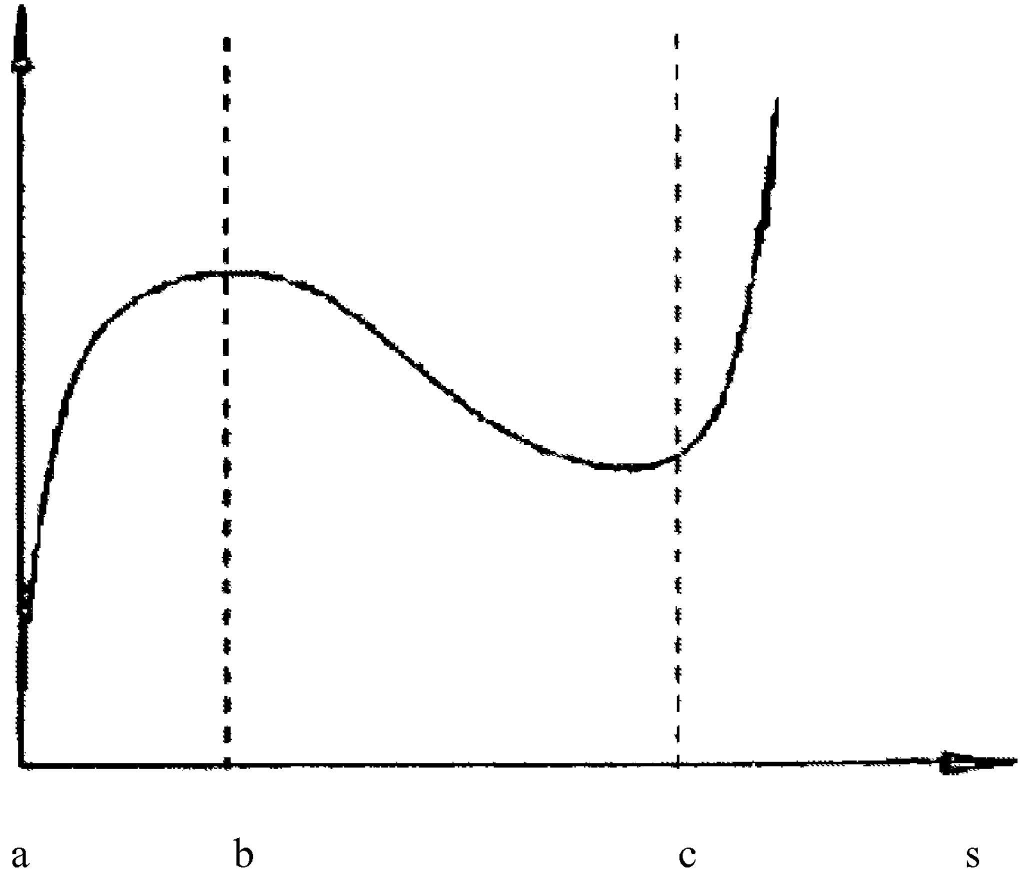
FIG. 2 is a force curve over the excursion of the lever.

In the position of the lever shown in position c of FIG. 2, the limit stop 8 limits the tilt travel of the primary lever arm 2 by means of the secondary lever arm 5 and the ball 4. Preferably the limit stop 8 is designed to be elastic in order to prevent an abruptly increasing opposing force. The slight resilience of the material of the limit stop 8 results in a rapid but steady increase in the opposing force.

FIG. 3 shows a view of a part of an alternative embodiment of the invention. The construction of the operating element corresponds to that in FIG. 1 with a second secondary lever arm 10 and a second pair of permanent magnets including the magnets 11 and 12. One end of the second secondary lever arm 10 is rigidly attached to the ball 4. Arranged at the other end of the second secondary lever arm 10 is the permanent magnet 11. The permanent magnet 12 is arranged in a fixed position in the housing 9 in such a way that when the lever is in its center position, an air gap exists between the magnets 11 and 12, and unlike poles of the magnets 11 and 12 are opposite one another. The primary lever arm 2 points out of the plane of the drawing, and is concealed by the handle 3.

A right angle is present between each secondary lever arm 5 or 10 and the primary lever arm 2, as well as between the two secondary lever arms 5 and 10. The pivot range of the second secondary lever arm 10 is limited by limit stops, which are not shown in FIG. 3.

If the primary lever arm 2 is tilted to the left, this tilting motion is transmitted by the ball 4 to the first secondary lever arm 5, causing the magnet 6 to move out of the plane of the drawing. A tilting of the primary lever arm 2 to the right results in a movement of the magnet 6 into the plane of the drawing. This relative motion of the magnet 6 as compared to the stationary magnet 7 produces, as described in the above example, an opposing force that is dependent on the current excursion of the lever and that the user must overcome. This applies in analogous fashion for the tilting movement of the primary lever arm 2 upward or downward, causing the magnet 11 arranged on the other end of the second secondary lever arm 10 to move into or out of the plane of the drawing relative to the stationary magnet 12. Consequently, a tilting of the primary lever arm in four primary directions is possible. A tilting of the primary lever arm 2 into a direction other than the four primary directions has the result that both permanent magnets 6 and 11 move relative to the stationary magnets 7 and 12.

FIG. 4 shows a lateral cross-sectional representation of an operating element 13, in which a ball 16 is rotatably mounted in a housing 21 and is also rigidly connected to a primary lever arm 14 and to a secondary lever arm 17. Here, the secondary lever arm 17 constitutes the extension of the primary lever arm 14. Arranged at one end of the primary lever arm 14 is a handle 15, which optionally has the functionality of a rotary control or of a pushbutton.

Located on the end of the secondary lever arm 17 facing away from the ball 16 is a round permanent magnet 18 with concentric poles. A second, round permanent magnet 19 with concentric poles is arranged in a fixed position in the housing 21 in such a way that when the lever is in its center position, an air gap is formed between the magnets 18 and 19, and unlike poles of the magnets 18 and 19 are opposite one another. A view of the magnet 19 is shown in FIG. 5.

If the primary lever arm 14 is deflected out of its center position, this produces, through the ball 16 and the secondary lever arm 17, a relative motion between the magnets 18 and 19. As already described with reference to FIGS. 1 and 2, this relative motion results in an opposing force dependent on the excursion of the primary lever arm, which force the user must overcome in order to tilt the lever. The advantage of implementing the secondary lever arm 17 as an extension of the primary lever arm 14 and using round permanent magnets is that one pair of permanent magnets is sufficient to produce the same force curve for any desired direction of tilt of the lever.

Figure 6:
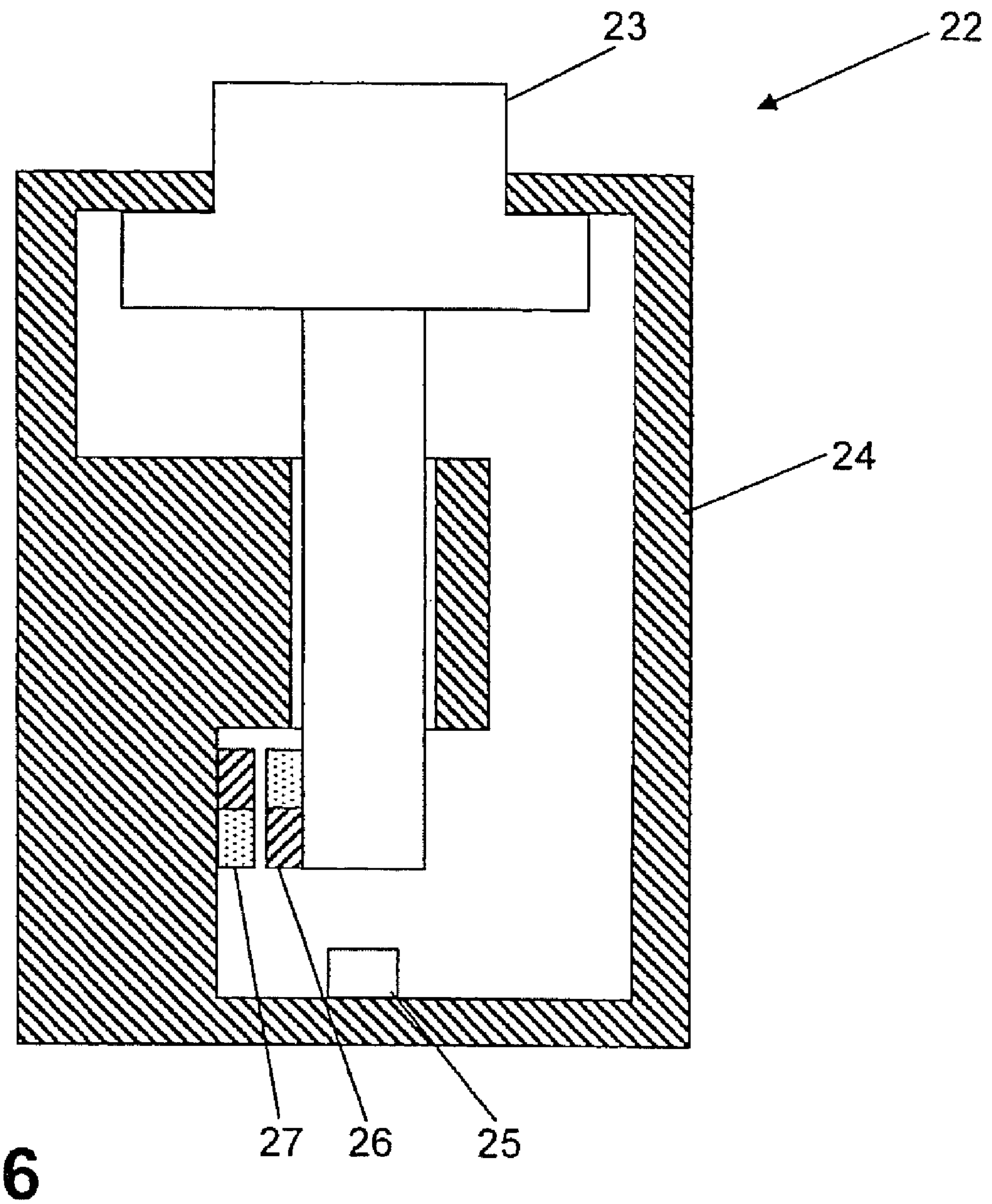
FIG. 6 is an inventive pushbutton.

FIG. 6 shows a cross-sectional representation of an inventive pushbutton 22, including a moving part 23 and a nonmoving part 24. A permanent magnet 26 is arranged on the moving part 23, and a permanent magnet 27 on the nonmoving part 24, in such a way that unlike poles of the magnets 26 and 27 are located opposite and a distance apart from one another when the pushbutton 22 is in its unactivated state. The attractive force between the magnets 26 and 27 holds the nonmoving part 23 in the position shown in FIG. 6 when the pushbutton is not activated. When a user activates the pushbutton 22 by depressing the moving part 23, this produces a relative motion between the magnets 26 and 27. Because of this relative motion, the attractive force between the magnets 26 and 27 changes, and hence also the force that the user must apply to press the moving part 23 downward. Again, the qualitative curve of this force over distance can be seen in FIG. 2. The stop 25 arranged on the nonmoving part 24 of the pushbutton 22 limits the travel of the moving part 23. Preferably the stop 25 is made of an elastic material. In this way, a rapidly but steadily increasing opposing force is achieved when the moving part 23 strikes the stop 25.

The forms of the invention cited in the above exemplary embodiments are examples only. Thus, other bearings than a four-way rocker can be used to support the lever, for example. The directions in which the lever can tilt can be delimited by means of a gate or detent, for example. For reasons of clarity, means for detecting actuation of the operating element or pushbutton have been omitted from all the figures. The position of the permanent magnet on the secondary lever arm can deviate from the embodiments shown. It is thus possible, for example, for a permanent magnet to be arranged on a lateral surface instead of the face of the secondary lever arm. Moreover, it is possible for the primary and secondary lever arms to coincide, thus for one magnet of a permanent magnet pair to be arranged on the primary lever arm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An operating element, in particular a joystick, with tilt haptics for a motor vehicle, the operating element comprising:

a tiltably supported lever with one primary lever arm and at least one secondary lever arm;

a handle arranged at the primary lever arm;

at least one mechanical limit stop for delimiting a range of motion of the secondary lever arm;

at least one pair of permanent magnets, wherein one magnet of a permanent magnet pair is provided on the secondary lever arm and the other magnet is located in a fixed position in the operating element in such a manner that unlike poles of the magnets are located opposite and at a distance apart from one another when the operating element is in a center position, the center position being a position of rest, only one position of rest being provided; and the at least one pair of permanent magnets returning the operating element to the center position when the operating element is moved out of the center position and released, wherein the pair of permanent magnets and the mechanical limit stop are arranged in a way that the force needed to excurse the lever out of the center position initially rises with growing excursion from the center position and thereafter, once a certain excursion is reached, falls with growing excursion from the center position until the secondary lever arm contacts the mechanical limit stop and thereafter rises with growing excursion, and the pair of permanent magnets and the mechanical limit stop are arranged in a way that a situation where, when the lever is in contact with the limit stop the permanent magnets are in a position relative to another in which like poles repel one another biasing the lever further out of the center position is prevented.

2. The operating element according to claim 1, wherein the primary and secondary lever arms are arranged at right angles to one another.

3. The operating element according to claim 1, wherein the mechanical limit stop is made of elastic material.

* * * * *